US007144852B2

(12) United States Patent
Ferguson et al.

(10) Patent No.: US 7,144,852 B2
(45) Date of Patent: Dec. 5, 2006

(54) PROCESS FOR PREPARATION OF PARTICLES

(75) Inventors: Paul Ferguson, Wirral (GB); Christopher Clarkson Jones, Wirral (GB); Paul Simon Stevenson, Wirral (GB)

(73) Assignee: Unilever Home & Personal Care USA division of Conopco, Inc., Greenwich, CT (US)

(*) Notice: Subject to any disclaimer, the term of this patent is extended or adjusted under 35 U.S.C. 154(b) by 0 days.

(21) Appl. No.: 11/146,396

(22) Filed: Jun. 6, 2005

(65) Prior Publication Data

US 2005/0277563 A1 Dec. 15, 2005

(30) Foreign Application Priority Data

Jun. 9, 2004 (GB) ................. 0412856.7

(51) Int. Cl.
*C11D 3/22* (2006.01)
(52) U.S. Cl. .............. 510/470; 510/473; 510/475; 525/54.2; 525/54.23; 525/54.3; 252/8.63; 252/8.86; 527/314
(58) Field of Classification Search ........ 527/314; 252/8.63, 8.86; 510/470, 473, 475; 525/54.3, 525/54.2, 54.23
See application file for complete search history.

(56) References Cited

U.S. PATENT DOCUMENTS 6,773,811 B1 8/2004 Jones et al.

FOREIGN PATENT DOCUMENTS

| WO | 99/36469 | 7/1999 |
| WO | 99/36470 | 7/1999 |
| WO | 03/010267 | 6/2003 |
| WO | 2004/056890 | 7/2004 |

OTHER PUBLICATIONS

Hasebe et al. "Chitosan Hybrid Deodorant Agent for Finishing Textiles." AATCC Review 2001, v.1, issue 11, p. 23-27.*
Marie et al. "Synthesis of Chitosan-Stabilized Polymer Dispersions, capsules, and Chitosan Grafting Products vai Miniemulsion." Biomacromolecules, 2002, v.3, p. 475-481.*
International Search Report, PCT/EP2005/055259, mailed Aug. 18, 2005—3 pp.
Hasebe, et al.; "Chitosan Hybrid Deodorant Agent for Finishing Textiles", AATCC Review, American Association of Textile Chemists & Colorists, US, vol. 1, No. 11, Nov. 2001, pp. 23-27, XP001047723.
Marie, et al., "Synthesis of Chitosan-Stabilized Polymer Dispersions, Capsules, and Chitosan Grafting Products Via Miniemulsion", Biomacromolecules, ACS, Washington, DC, US, vol. 3, No. 3, May 2002, pp. 475-481, XP008047477.
Aizpurua, et al., "High Solids Content Miniemulsion Polymerization of Vinyl Acetate in a Continuous Stirred Tank Reactor", Polymer, Elsevier Science Publishers, B.V., BG, vol. 42, No. 4, Feb. 2001, pp. 141701427, XP004219058.
Landfester, "Polyreactions in Miniemulsions", Macromoecular: Rapid Communications, Wiley Vch., Weinheim, DE, vol. 22, No. 12, Aug. 30, 2001, pp. 896-936, XP001077169.
GB Search Report, GB 0412856.7, dated Nov. 8, 2004—1 p., Pursuant to MPEP § 2001.6(b) applicants bring the following *co-pending application* to the Examiner's attention:, Applicant: Ferguson, et al., Case No.: C4280(C), U.S. Appl. No. 10/738,192, filed Dec. 17, 2003, For: Fabric Care Composition.

\* cited by examiner

*Primary Examiner*—Lorna M. Douyon
*Assistant Examiner*—Amina Khan
(74) *Attorney, Agent, or Firm*—Alan A. Bornstein

(57) ABSTRACT

The present invention is directed to a process for the preparation of polysaccharide-grafted polymer particles wherein the polysaccharide is preferably a β-1,4 linked polysaccharide, comprising miniemulsion polymerisation.

15 Claims, No Drawings

PROCESS FOR PREPARATION OF PARTICLES

TECHNICAL FIELD

The present invention relates to a process for the preparation of polysaccharide-grafted polymer particles using miniemulsion polymerisation, and to the particles themselves and their uses, such as delivery to fabric during laundering.

BACKGROUND OF THE INVENTION

The deposition of a benefit agent onto a substrate, such as a fabric, is a well known method of imparting desirable properties to the substrate. In laundry applications the range of "benefit agents" is diverse and includes fabric softeners and conditioners, soil release polymers, shape retention agents, anti-crease agents, ease of ironing aids, perfumes, lubricants, texturising agents, insecticide repellents, fungicides, photofading inhibitors, fluorescers, sunscreens and many others. Deposition of a benefit agent is used, for example, in fabric treatment processes such as fabric conditioning to confer, for example, softening benefit to the fabric.

Conventionally, the deposition of the benefit agent has had to rely upon attractive forces between the oppositely charged substrate and the benefit agent. For example, cotton is negatively charged and thus requires a positively charged benefit agent in order for the benefit agent to be substantive to the cotton, i.e. to have an affinity for the cotton so as to absorb onto it.

However, adverse charge considerations can place severe limitations upon the inclusion of benefit agents in compositions where an active component thereof is of an opposite charge to that of the benefit agent. For example, cationic fabric conditioning agents are incompatible with anionic surfactants in laundry washing compositions, hence fabric conditioning products are usually separate from main wash products. Furthermore, the substantivity of the benefit agent can be severely reduced and/or the deposition rate of the benefit agent can be reduced because of the presence of incompatible charged species in the compositions. The conventional way around this problem is to add benefit agents during the rinsing step of a treatment process so as to avoid adverse effects from other charged chemical species present in the main wash compositions. This has clear cost disadvantages to the consumer and instigates the need for two separate products instead of one.

However, in recent times, it has been proposed to deliver a benefit agent in a form whereby it is substituted onto another chemical moiety, which itself has an affinity for the substrate in question.

PRIOR ART

WO 99/36469 is directed to a polysaccharide conjugate capable of binding cellulose. Locust bean gum (LBG) is grafted to proteins, such as enzymes or anti-bodies or perfume loaded particles. This is delivered to the fabric during the laundering. The LBG attachment is achieved by enzymatic oxidation of the LBG using galactose oxidase to introduce aldehyde groups. These aldehyde groups are then reacted with glucose oxidase (using sodium cyanoborohydride) to form an LBG with chemically bound glucose oxidase. This procedure for preparing the material is cumbersome and involves numerous steps using 'conventional' organic (enzymatic) chemistry, such as purification of LBG, introducing aldehyde functionality to the LBG and coupling of this to an enzyme (via the enzymes hydroxyl functionality).

WO 99/36470 is also directed to polysaccharide conjugates that are able to bind cellulose, where the polysaccharide is attached to a particle containing perfume. The particle may be a range of materials, including silica. Perfume is allowed to infuse into macroporous silica particles simply by absorption, adsorption, impregnation and/or encapsulation. The polysaccharide, e.g. LBG, is then merely added to the perfumed particles and is physically adsorbed onto the particle surface. The LBG aids deposition in a wash environment.

European patent application number 01306632.9 is directed to a water dispersible particle comprising a deposition enhancing part of one or more polymeric units and a benefit agent attached to the deposition enhancing part. Preferably the deposition aid has a hydrolysable group (based on esters), such as Cellulose Mono-Acetate (CMA). The modified particles are prepared by reaction of acid functional beads by a cumbersome multi-step 'conventional' organic chemistry technique. This requires several time consuming (and commercially nonviable for high volume production) centrifugation stages and the preparation of an amine functional CMA by reaction of CMA with ethylene diamine using carbonyl diimidazole as coupling agent. The amine functional CMA is then reacted with acid functional beads (obtained externally) using ethyl dimethyl aminopropyl carbodimide as coupler. This results in CMA grafted particles which exhibit enhanced wash deposition.

Our GB patent application number 0229806.5 is directed towards a process for the preparation of polysaccharide grafted latex particles which comprises conventional emulsion polymerisation and to the materials thus produced. The particles have been used as carriers for benefit agents, including softeners, for deposition under main wash conditions. However, constraints on the amount of benefit agents which can be incorporated into the particles and the types of monomer units that can be used, which are inherent to conventional emulsion polymerisation, are inevitable.

Despite these advances, the need remains for more efficient deposition systems which are more cost effective and which are capable of delivering a wider range of benefit agents under a range of use conditions (e.g. main wash conditions).

We have now surprisingly found that a process for the preparation of polysaccharide-grafted polymer particles that uses miniemulsion polymerisation, rather than conventional emulsion polymerisation, allows the incorporation of a far wider range of (for example more hydrophilic benefit agents) and increased levels of benefit agents into the particle itself, and also allows the use of a wider range of monomer types, which in turn results in greater benefit delivery to the substrate.

DEFINITION OF THE INVENTION

A first aspect of the invention is a process for the preparation of polysaccharide-grafted polymer particles, wherein the polysaccharide has β-1,4 linkages, wherein the process for preparation comprises miniemulsion polymerisation of monomers.

According to a second aspect of the invention, there is provided a method of treating fabric, preferably cotton, comprising contacting the fabric with the polysaccharide-grafted polymer particles obtainable by the process of the first aspect of the invention.

According to a third aspect of the invention, there is provided the use of a polysaccharide-grafted particle obtainable by the process as defined above in the treatment of fabric, preferably cotton, to deliver one or more benefit agents to the fabric.

According to a fourth aspect of the invention there is provided a laundry treatment composition comprising the polysaccharide-grafted polymer particle as produced by the process of the first aspect of the invention.

The invention further provides the uses of the laundry treatment composition of the fourth aspect in the treatment of fabric and in the delivery of benefit agent thereto, and a corresponding method of treating fabric.

DETAILED DESCRIPTION OF THE INVENTION

The present invention is directed towards a miniemulsion polymerisation process for preparing polysaccharide-grafted polymer particles, such as latex particles. The particles may contain additional benefit agents and/or act as the benefit agent itself. We have found that such polysaccharide-grafted polymer particles have been deposited during the main wash onto fabric, preferably cotton, at levels of from 8 to 28 times greater than non-polysaccharide control particles.

The term "latex" or "latex particle" as used herein is defined as a stable colloidal dispersion of a polymeric substance in an aqueous medium. The polymer particles are usually approximately spherical and of typical colloidal dimensions. Particle diameters may range from about 30 to 500 nm (The Encyclopedia of Polymer Science and Engineering, Second Edition, Volume 8, Page 647, John Wiley and Sons Inc. (1987)).

Emulsion polymerisation techniques are described in "Emulsion Polymerisation and Emulsion Polymers", P. A. Lovell and M. S. El-Aasser (eds.), John Wiley and Son Ltd (1997).

Core/shell emulsion polymerisation techniques are described in L. W. Morgan, J. Appl. Polym. Sci., 27, 2033 (1982), V. L. Dimonie, A. Klein, M. S. El-Aasser and J. W. Vanderhoff, J. Polym. Sci., Polym. Chem., 22, 2197 (1984), D. I. Lee, in "Emulsion Polymers and Emulsion Polymerisation" D. R. Bassett and A. E. Hamielec (eds.), ACS Symposium Ser., No. 165, p. 405 (1981) and W. D. Hergeth, K. Schmutzler and S. Wartewig, Makromol. Chem., Macromol. Symp., 31, 123 (1990).

THE PROCESS FOR PREPARATION

Miniemulsion polymerisation is well known in the art and the term "miniemulsion polymerisation" as used herein means the same as the term known in the art. Numerous scientific reviews of miniemulsion techniques have been published:

1) El Aasser, M. S., Miller, C. M., "Preparation of latexes using miniemulsions", In: Asua, J. M., editor. Polymeric dispersions. Principles and applications. Dordrecht: Kluwer, p. 109–126 (1997)
2) Sudol, E. D., El Aasser, M. S., "Miniemulsion polymerisation", In: Lovell, P. A., El Aasser, M. S., editors. Emulsion polymerisation and emulsion polymers. Chichester: Wiley, p. 699–722 (1997)
3) Asua, J. M., Prog. Polym. Sci., 27, 1283–1346 (2002)

Miniemulsions generally lie in between macroemulsion and microemulsions in terms of droplet size and emulsion stability. Miniemulsion droplets typically range in size from 50 to 500 nm. The emulsion can be stable for as little as a few days or for as long as a month. The droplets may be stabilised by the addition of an ionic surfactant (e.g. sodium lauryl sulphate) and a cosurfactant. The latter usually consists of either a long chain alkane (e.g. hexadecane) or an alcohol (e.g. hexadecanol). The function of the cosurfactant is twofold; it acts in combination with the surfactant to create a barrier to droplet/droplet coalescence by arranging at the oil-water interface and it also limits diffusion of the oil phase from smaller to larger droplets by virtue of its low water solubility.

Miniemulsions are typically formed by subjecting an oil (monomer), water, surfactant and cosurfactant system to high shear fields created by devices such as ultrasonifiers, homogenisers and microfluidisers. These devices rely on mechanical shear and/or cavitation to break the oil phase into submicron size droplets. When monomer is used as the oil phase, free radical polymerisation can subsequently be carried out by the addition of an initiator (e.g. ammonium persulphate). Such a process in which the miniemulsion droplets are converted to polymer particles is referred to as miniemulsion polymerisation. For the sake of clarity, by "miniemulsion droplet or emulsion droplet" as used herein is meant the miniemulsion droplet before it is polymerised, and "emulsion particles" means the polymerised miniemulsion droplets.

In conventional emulsion polymerisation the monomer diffuses through the aqueous phase to the surfactant formed micelles. Particle nucleation begins and proceeds in these micelles and the monomer droplets merely act as a reservoir of monomer. Whereas in miniemulsion polymerisation the presence of cosurfactant and the use of high shear results in the formation of small monomer droplets. These droplets are polymerised directly and no monomer diffusion to micelles occurs and no particle formation occurs within micelles. Such differences are well documented in the literature for example in "Emulsion Polymerisation and Emulsion Polymers", Edited by P. A. Lovell and M. S. El-Aasser, John Wiley and Sons, Chapter 20, page 700–703.

In conventional emulsion polymerisation, the benefit agent can only be incorporated at relatively low levels (typically 10% or less by weight of the particle) and must be sparingly water soluble, have low molecular weight (typically under 1,000 g) and have similar water solubility and diffusion rate as the monomer. However, for the miniemulsion polymerisation, none of these restraints apply. This allows the incorporation of higher levels (typically from 10 to 60%) and a wider variety of benefit agents, such as completely water insoluble and polymeric benefit agents (e.g. silicone resins and thermoplastic elastomers), in polymer particles, which cannot be achieved using conventional emulsion polymerisation techniques.

The process of the invention is for the preparation of polysaccharide-grafted polymer particles by miniemulsion polymerisation.

Preferably, the process comprises the steps of:
(a) preparation of a miniemulsion, and
(b) polymerisation of the miniemulsion of step (a),
   wherein grafting of the polysaccharide to the polymer particles occurs in step (b).

Step (a) may consist of the following sub-steps:
(i) monomers are mixed with a cosurfactant to form a mixture (y), (ii) a polysaccharide and a surfactant are dissolved in water to form a mixture (z),
(iii) (y) and (z) are combined and subjected to high shear to form an emulsion,
(iv) the emulsion of step (iii) is then subjected to further shear (such as sonication or other suitable high pressure homogeniser such as a Microfluidiser or a Manton Gaulin homogeniser) to form a miniemulsion.

Preferably, an initiator is added to the miniemulsion (during step (b)) such that polymerisation of the monomers (and simultaneous grafting of the polysaccharide onto the polymer particles) proceeds.

A preferred process comprises the steps of:
(i) monomers are mixed with a cosurfactant to form a mixture (y),
(ii) a polysaccharide and a surfactant are dissolved in water to form a mixture (z),
(iii) (y) and (z) are combined and subjected to high shear to form a miniemulsion and
(iv) an initiator is added such that polymerisation (and simultaneous grafting of the polysaccharide onto the polymer particles) proceeds.

The resulting polymer particles preferably have a particle size of less than 1 micron, more preferably of less than 500 nm.

High Shear as used herein is applied using any suitable apparatus such as an ultrasound sonicat, or, microfluidizer or homogenizer. High Shear as used in step (iv) above is defined as shear of sufficiently high intensity that the emulsion of step (iii) above is reduced in particle size to sub-micron dimensions, preferably under 500 nm. Suitably, the emulsion of step (iv) is formed using a high shear homogeniser at 10,000 to 24,000 rpm for approximately 30 seconds to 5 minutes and then sonified using a probe ultrasound sonicator (at maximum power output) for 10 minutes to generate the miniemulsion. A suitable homogeniser is a Manton Gaulin homogeniser or any other make of high shear homogenizer such as an Ultra Turrax.

The Monomers

A wide range of monomers can be used in the process of the invention. By "monomer units" as used herein is meant the monomeric units of the polymer chain, thus references to "a polymer particle comprising hydrophobic monomer units" as used herein means that the polymer particles is derived from hydrophobic monomers, and so forth.

Preferably, the monomer is a monomer suitable for free radical aqueous mini emulsion polymerisation. Therefore, preferably the monomer contains at least one ethylenically unsaturated group capable of undergoing addition polymerisation.

A mixture of monomers may be used. The monomers of the mixture may be selected according to their solubilities. Preferably, the monomer mixture comprises monomers of low solubility and monomers of high solubility.

By low solubility as used herein in reference to monomers, is meant that the material is soluble in water (distilled or equivalent) at a concentration in the range of from 0.1 to 30 g/litre, at 25° C.

By high solubility as used herein in reference to monomers, is meant that the material is soluble in water (distilled or equivalent) at a concentration of greater than 30 g/litre, at 25° C.

In a preferred embodiment of the invention, those monomers that are of low solubility preferably make up greater than 30%, preferably 35 to 99% of the mixture, by weight of the total monomer mixture, and those monomers of high solubility preferably make up less than 30%, preferably 1 to 25% of the mixture, by weight of the total monomer mixture.

Examples of suitable monomers having low solubility as defined above include olefins, ethylene, vinylaromatic monomers such as divinyl benzene, styrere, α-methylstyrene, o-chlorostyrene or vinyltoluenes, esters of vinyl alcohol and monocarboxylic acids, such as vinyl acetate, vinyl propionate, vinyl n-butyrate, vinyl laurate and vinyl stearate, esters of α,β-monoethylenically unsaturated mono- and dicarboxylic acids, such as acrylic, methacrylic, maleic, fumaric and itaconic acid, with alcohols, such as methyl, ethyl, n-butyl, isobutyl and 2-ethylhexyl alcohol, dimethyl or di-n-butyl maleate, nitriles of α,β-monoethylenically unsaturated carboxylic acids, such as acrylonitrile, and conjugated dienes, such as 1,3-butadiene and isoprene. Preferred monomers include vinyl acetate, methacrylate and styrene. Most preferred monomers include methyl methacrylate, methacrylic acid and ethylene glycol dimethacrylate.

Examples of suitable monomers having high solubility as defined above are α,β-monoethylenically unsaturated monocarboxylic and dicarboxylic acids and their amides, such as acrylic acid, methacrylic acid, maleic acid, fumaric acid, itaconic acid, acrylamide, methacrylamide, poly (alkylene oxide) monoacrylates and monomethacrylates, vinyl-sulfonic acid and its water-soluble salts, and N-vinyl-pyrrolidone.

Monomers which internally crosslink the emulsion droplets may also be incorporated during the polymerisation. Such crosslinkers have at least two non-conjugated ethylenically unsaturated double bonds. Examples are alkylene glycol diacrylates and dimethacrylates such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, and triallyl cyanurate. These monomers are copolymerised mostly in amounts of from 0.5 to 10% by weight, based on the total amount of monomers to be polymerised.

In a further preferred embodiment of the invention, insoluble (i.e. very hydrophobic) latex monomers (by "insoluble" is meant that the material is not soluble in water (distilled or equivalent) at a concentration of 0.1 g/litre or above, at 25° C.) are used. Examples include but are not limited to long chain hydrocarbon monoacrylates and methacrylates. Preferably, the carbon chain length is greater than 10 carbon atoms, as for example in lauryl and stearyl methacrylates.

The process of the invention can be used to produce particles from hydrophilic monomers, i.e. monomers of solubility of greater than about 30 g/litre, preferably greater than 35 g/litre, for example 40 to 45 g/litre in water (distilled or equivalent) at 25° C. Examples include but are not limited to methacrylic and acrylic acid, 2-hydroxyethyl acrylates and methacrylates, glycerol acrylates and methacrylates, poly(ethylene glycol) methacrylates and acrylates, n-vinyl pyrrolidone, acryloyl morpholine, n-vinyl acetamide, vinyl caprolactone. Such monomers may be utilised at levels of at least 10% based on particle weight, preferably from 10 to 80%, more preferably from 15 to 50% and most preferably from 20 to 40% by weight of the particle.

The monomer is mixed with a cosurfactant. Suitable cosurfactants for use in the present invention include hexadecane, cetyl alcohol, lauroyl peroxide, n-dodecyl mercaptan, dodecyl methacrylate, stearyl methacrylate, polystyrene and polymethyl methacrylate. The preferred cosurfactant comprises hexadecane.

Initiators and chain transfer agents may also be present. Those skilled in the art will recognise that a chemical initiator will generally be required but that there are instances in which alternative forms of initiation will be possible, e.g. ultrasonic initiation or initiation by irradiation.

The initiator is preferably a chemical or chemicals capable of forming free radicals in an aqueous environment. Typically, free radicals can be formed either by homolytic scission (i.e. homolysis) of a single bond or by single electron transfer to or from an ion or molecule (e.g. redox reactions).

Suitably, in context of the invention, homolysis may be achieved by the application of heat (typically in the range of from 50 to 100° C.). Some examples of suitable initiators in this class are those possessing peroxide (—O—O—) or azo (—N=N—) groups, such as benzoyl peroxide, t-butyl peroxide, hydrogen peroxide, azobisisobutyronitrile and ammonium persulphate. Homolysis may also be achieved by the action of radiation (usually ultraviolet), in which case it is termed photolysis. Examples are the dissociation of 2,2'-azobis (2-cyanopropane) and the formation of free radicals from benzophenone and benzoin.

Redox reactions can also be used to generate free radicals. In this case an oxidising agent is paired with a reducing agent which then undergo a redox reaction. Some examples of appropriate pairs in the context of the invention are ammonium persulphate/sodium metabisulphite, cumyl hydroperoxide/ferrous ion and hydrogen peroxide/ascorbic acid.

Preferred initiators are be selected from the following: Homolytic: benzoyl peroxide, t-butyl peroxide, hydrogen peroxide, azobisisobutyronitrile, ammonium persulphate, 2,2'-azobis (cyanopropane), benzophenone, benzoin, Redox: ammonium persulphate/sodium metabisulphite mixture, cumyl hydroperoxide/ferrous ion mixture and/or hydrogen peroxide/asorbic acid mixture. The preferred initiator is ammonium persulphate. The preferred level of initiator is in the range of from 0.1 to 5.0% w/w by weight of monomer, more preferably, the level is in the range of from 1.0 to 3.0% w/w by weight of monomer.

Chain transfer agents can optionally be used to reduce the degree of polymerisation and hence the final molecular weight of the polymer. A chain transfer agent contains very labile hydrogen atoms that are easily abstracted by a propagating polymer chain. This terminates the polymerisation of the growing polymer, but generates a new reactive site on the chain transfer agent that can then proceed to initiate further polymerisation of the remaining monomer. Chain transfer agents in the context of the invention typically contain thiol (mercaptan) functionality and can be represented by the general chemical formula RS—H, such as n-dodecyl mercaptan and 2-mercaptoethanol. The preferred chain transfer agent is monothioglycerol, used at levels of, preferably from 0 to 5% w/w based on the weight of the monomer and more preferably at a level of 0.25% w/w based on the weight of the monomer.

The Benefit Agent

The polysaccharide-grafted polymer particle (i.e. without additional benefit agent) produced by the process of the invention, if applied to the fabric during laundering, may provide one or more benefits to the fabric, selected from but not limited to: stiffening, starching, softening, drape modifying, lubricating, elastomeric, shape retention, crease reduction, ease of ironing, moisturising, colour preservation and anti-pilling, depending on the specific particle monomers utilised.

However, preferably, the polysaccharide-grafted polymer particle contains an additional benefit agent when used in laundering. When present, this additional benefit agent is pre-mixed, preferably pre-dissolved in the monomers. The presence of the additional benefit agent may enhance the benefit(s) conferred by the polymer particle itself (listed above) and/or confer further benefit(s).

The benefit agent may be any agent that is capable of imparting desirable properties to the substrate it is applied to. Preferably, the benefit agent is a fabric benefit agent.

A fabric benefit agent is any suitable agent which affects the feel, appearance, or perception of a fabric. The fabric benefit agent may be selected from, but is not limited to, the following: fabric softeners, lubricants, ease of ironing aids, stiffening agents, moisturising agents, shape retention aids, crease reduction agents, anti-pilling agents, colour preservatives, perfumes, drape modifiers, fluorescers, sunscreens, photofading inhibitors, fungicides and insect repellents.

Suitable fabric softeners are amino functional silicone oils such as Rhodorsil Oil Extrasoft supplied by Rhodia Silicones. Other silicones may be selected from those disclosed GB1,549,180A, EP459,821A2 and EP459822A. These silicones can also be used as lubricants. Other suitable lubricants include any of those known for use as dye bath lubricants in the textile industry.

The process of the invention can be used to prepare polysaccharide-grafted polymer particles which comprise preformed polymers. These may be prepared by non free radical polymerisation. Examples include but are not limited to polysiloxanes, polyesters, polyamides, polyurethanes, polyethers, epoxy resins, alkyd resins, phenolic resins. These may make up from 10 to 99%, preferably from 20 to 90%, more preferably from 25 to 80% and most preferably from 40 to 80% (w/w) of the total particle.

Alternatively, the preformed polymers may comprise block copolymers, for example ABA triblock thermoplastic elastomers. Such block copolymers may be present at levels of from 10 to 99%, preferably from 20 to 90%, more preferably from 25 to 80% and most preferably from 40 to 80% based on total particle weight.

The process of the invention can be used to prepare polysaccharide-grafted polymer particles which comprise an inorganic solid and/or an organic solid. Preferred inorganic and organic solids are selected from the group consisting of titanium dioxide, zinc oxide, benzophenones, pigments and organic dyes or mixtures thereof.

The process of the invention can also be used to prepare polysaccharide-grafted polymer particles which comprise a mixture of preformed polymers and inorganic or organic solids.

When the particles produced by the process of the invention comprise hydrophilic or very hydrophobic monomers as given above, then preferably, no additional preformed polymers or inorganic/organic solids are included.

The Polysaccharide

The polysaccharide preferably has a β-1,4-linked backbone. Preferably the polydaccharide is a cellulose, a cellulose derivative, or another P-1,4-linked polysaccharide having an affinity for cellulose, such as polymannan, polyglucan, polyglucomannan, polyxyloglucan and polygalactomannan. More preferably, the polysaccharide is selected from the group consisting of polyxyloglucan and polygalactomannan. For example, preferred polysaccharides are locust bean gum, tamarind xyloglucan, guar gum or mixtures thereof. Most preferably, the polysaccharide is locust bean gum.

The polysaccharide acts as a delivery aid/deposition agent for the particle (and additional benefit agent if present).

Preferably, the polysaccharide backbone has only β-1,4 linkages. Optionally, the polysaccharide has linkages in addition to the β-1,4 linkages, such as B-1,3 linkages. Thus, optionally some other linkages are present. Polysaccharide backbones which include some material which is not a saccharide ring are also within the ambit of the present invention (whether terminal or within the polysaccharide chain).

The polysaccharide may be straight or branched. Many naturally occurring polysaccharides have at least some degree of branching, or at any rate at least some saccharide rings are in the form of pendant side groups (which are therefore not in themselves counted in determining the degree of substitution) on a main polysaccharide backbone.

Preferably, the polysaccharide is present at levels of between 0.1% to 10% w/w by weight of the monomer, preferably 2% w/w by weight of monomer.

Grafted Polysaccharide

During the miniemulsion polymerisation step of the process of the invention, the polysaccharide becomes grafted to the polymer particle. By grafted as used herein, in the context of the invention, is meant attached. Attachment may be by means of a covalent bond, entanglement or strong adsorption, preferably by a covalent bond or entanglement and most preferably by means of a covalent bond. By entanglement as used herein is meant that the polysaccharide is adsorbed onto the particle during the particle formation stage and consequently, as the polymerisation proceeds and the particle grows in size, part of the adsorbed polysaccharide becomes buried within the interior of the particle. Hence at the end of the polymerisation, part of the polysaccharide is entrapped and bound in the particle polymer matrix, whilst the remainder is free to extend into the aqueous phase.

By strong adsorption as used herein is meant strong adsorption of the polysaccharide to the surface of the particle; such adsorption can, for example, occur due to hydrogen bonding, Van Der Waals or electrostatic attraction between the polysaccharide chains and the particle.

The grafted polysaccharide is thus mainly attached to the particle surface and is not, to any significant extent, distributed throughout the internal bulk of the particle. This is distinct from graft copolymers in which a polysaccharide may be grafted along the length of a polymer chain. A particle which is formed from a graft copolymer would, therefore, contain polysaccharide throughout the internal bulk of the particle as well as on the particle surface. Thus the particle which is produced according to the process of the invention can be thought of as a "hairy particle", which is different from a graft copolymer. This feature of the invention provides significant cost reduction opportunities for the manufacturer as much less polysaccharide is required to achieve the same level of activity as systems which utilise polysaccharide copolymers.

The Polysaccharide-Grafted Particle

When used in laundering, the polysaccharide-grafted polymer particle deposits onto the fabric, preferably cotton, at higher levels than non-polysaccharide particles. The polysaccharide-grafted polymer particle may be used in the treatment of fabric, preferably cotton. Such treatment may provide a stiffening, softening, drape modifying, lubricating, elastomeric, shape retention, crease reduction, ease of ironing, moisturising, colour preservation, anti-pilling benefit to the fabric dependent on particle monomers utilised.

When additional benefit agents are used, either additional properties depending on the benefit agent used will be imparted to the fabric, and/or the benefits conferred by the particle itself will be enhanced.

Alternatively, the polysaccharide-grafted polymer particle may be incorporated into a laundry treatment composition and used in the treatment of fabric, preferably cotton.

The polysaccharide-grafted polymer particles produced by the process of the present invention may also be used as stiffening finishes or drape modifiers for the textile finishing industry, as binders for paper and card production, as performance enhancers for wood and paper adhesives and as self-priming agents for wood paints. Thus, applications other than in the fabric care field are contemplated by the present invention.

As mentioned above, the particles of the invention may be thought of as "hairy particles". The term "hairy particles" is known in the art and is generally defined as particles with attached polymer chains such that part of the polymer is attached or buried in the particle matrix and the remainder of the polymer is free to extend into the surrounding water phase.

Laundry Treatment Compositions

The polysaccharide-grafted particles may be incorporated into laundry compositions.

The polysaccharide-grafted particles are typically included in said compositions at levels of from 0.001% to 10%, preferably from 0.005% to 5%, most preferably from 0.01% to 3% by weight of the total composition.

The active ingredient in the compositions is preferably a surface active agent or a fabric conditioning agent. More than one active ingredient may be included. For some applications a mixture of active ingredients may be used.

The compositions of the invention may be in any physical form e.g. a solid such as a powder or granules, a tablet, a solid bar, a paste, gel or liquid, especially, an aqueous based liquid. In particular the compositions may be used in laundry compositions, especially in liquid, powder or tablet laundry composition.

The compositions of the present invention are preferably laundry compositions, especially main wash (fabric washing) compositions or rinse-added softening compositions. The main wash compositions may include a fabric softening agent and the rinse-added fabric softening compositions may include surface-active compounds, particularly non-ionic surface-active compounds.

The detergent compositions of the invention may contain a surface-active compound (surfactant) which may be chosen from soap and non-soap anionic, cationic, non-ionic, amphoteric and zwitterionic surface-active compounds and mixtures thereof. Many suitable surface-active compounds are available and are fully described in the literature, for example, in "Surface-Active Agents and Detergents", Volumes I and II, by Schwartz, Perry and Berch.

The preferred detergent-active compounds that can be used are soaps and synthetic non-soap anionic, and non-ionic compounds.

The compositions of the invention may contain linear alkylbenzene sulphonate, particularly linear alkylbenzene sulphonates having an alkyl chain length of from C8 to C15.

It is preferred if the level of linear alkylbenzene sulphonate is from 0 wt % to 30 wt % %, more preferably from 1 wt % to 25 wt %, most preferably from 2 wt % to 15 wt %, by weight of the total composition.

The compositions of the invention may contain other anionic surfactants in amounts additional to the percentages quoted above. Suitable anionic surfactants are well-known to those skilled in the art. Examples include primary and secondary alkyl sulphates, particularly C8 to C15 primary alkyl sulphates; alkyl ether sulphates; olefin sulphonates; alkyl xylene sulphonates; dialkyl sulphosuccinates; and fatty acid ester sulphonates. Sodium salts are generally preferred.

The compositions of the invention may also contain non-ionic surfactant. Nonionic surfactants that may be used include the primary and secondary alcohol ethoxylates, especially the C8 to C20 aliphatic alcohols ethoxylated with an average of from 1 to 20 moles of ethylene oxide per mole of alcohol, and more especially the C10 to C15 primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

It is preferred if the level of non-ionic surfactant is from 0 wt % to 30 wt %, preferably from 1 wt % to 25 wt %, most preferably from 2 wt % to 15 wt %, by weight of the total composition.

Any conventional fabric conditioning agent may be used in the compositions of the present invention. The conditioning agents may be cationic or non-ionic. If the fabric conditioning compound is to be employed in a main wash detergent composition the compound will typically be non-ionic. For use in the rinse phase, typically they will be cationic. They may for example be used in amounts from 0.5% to 35%, preferably from 1% to 30% more preferably from 3% to 25% by weight of the composition.

Suitable cationic fabric softening compounds are substantially water-insoluble quaternary ammonium materials comprising a single alkyl or alkenyl long chain having an average chain length greater than or equal to C20 or, more preferably, compounds comprising a polar head group and two alkyl or alkenyl chains having an average chain length greater than or equal to C14. Preferably the fabric softening compounds have two long chain alkyl or alkenyl chains each having an average chain length greater than or equal to C16. Most preferably at least 50% of the long chain alkyl or alkenyl groups have a chain length of C18 or above. It is preferred if the long chain alkyl or alkenyl groups of the fabric softening compound are predominantly linear.

Quaternary ammonium compounds having two long-chain aliphatic groups, for example, distearyldimethyl ammonium chloride and di(hardened tallow alkyl) dimethyl ammonium chloride, are widely used in commercially available rinse conditioner compositions. Other examples of these cationic compounds are to be found in "Surfactants Science Series" volume 34 ed. Richmond 1990, volume 37 ed. Rubingh 1991 and volume 53 eds. Cross and Singer 1994, Marcel Dekker Inc. New York".

Any of the conventional types of such compounds may be used in the compositions of the present invention.

The fabric softening compounds are preferably compounds that provide excellent softening, and are characterised by a chain melting $L\beta$ to $L\alpha$ transition temperature greater than 250° C., preferably greater than 350° C., most preferably greater than 450° C. This $L\beta$ to $L\alpha$ transition can be measured by differential scanning calorimetry as defined in "Handbook of Lipid Bilayers", D Marsh, CRC Press, Boca Raton, Fla., 1990 (pages 137 and 337).

Substantially water-insoluble fabric softening compounds are defined as fabric softening compounds having a solubility of less than $1 \times 10^{-3}$ wt % in demineralised water at 20° C. Preferably the fabric softening compounds have a solubility of less than $1 \times 10^{-4}$ wt %, more preferably from less than $1 \times 10^{-8}$ to $1 \times 10^{-6}$ wt %.

Especially preferred are cationic fabric softening compounds that are water-insoluble quaternary ammonium materials having two C12–22 alkyl or alkenyl groups connected to the molecule via at least one ester link, preferably two ester links. An especially preferred ester-linked quaternary ammonium material can be represented by the formula:

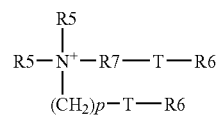

wherein each R5 group is independently selected from C1–4 alkyl or hydroxyalkyl groups or C2–4 alkenyl groups; each R6 group is independently selected from C8–28 alkyl or alkenyl groups; and wherein R7 is a linear or branched alkylene group of 1 to 5 carbon atoms, T is

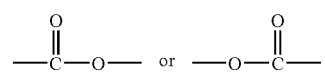

and p is 0 or is an integer from 1 to 5.

Di(tallowoxyloxyethyl) dimethyl ammonium chloride and/or its hardened tallow analogue is an especially preferred compound of this formula.

A second preferred type of quaternary ammonium material can be represented by the formula:

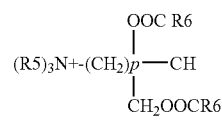

wherein R5, p and R6 are as defined above.

A third preferred type of quaternary ammonium material are those derived from triethanolamine (hereinafter referred to as 'TEA quats') as described in for example U.S. Pat. No. 3,915,867 and represented by formula:

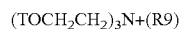

wherein T is H or (R8-CO—) where R8 group is independently selected from C8–28 alkyl or alkenyl groups and R9 is C1–4 alkyl or hydroxyalkyl groups or C2–4 alkenyl groups. For example N-methyl-N,N,N-triethanolamine ditallowester or di-hardened-tallowester quaternary ammonium chloride or methosulphate. Examples of commercially available TEA quats include Rewoquat WE18 and Rewoquat WE20, both partially unsaturated (ex. WITCO), Tetranyl AOT-1, fully saturated (ex. KAO) and Stepantex VP 85, fully saturated (ex. Stepan).

It is advantageous if the quaternary ammonium material is biologically biodegradable.

Preferred materials of this class such as 1,2-bis(hardened tallowoyloxy)-3-trimethylammonium propane chloride and their methods of preparation are, for example, described in U.S. Pat. No. 4,137,180 (Lever Brothers Co). Preferably these materials comprise small amounts of the corresponding monoester as described in U.S. Pat. No. 4,137,180, for example, 1-hardened tallowoyloxy-2-hydroxy-3-trimethylammonium propane chloride.

Other useful cationic softening agents are alkyl pyridinium salts and substituted imidazoline species. Also useful are primary, secondary and tertiary amines and the condensation products of fatty acids with alkylpolyamines.

The compositions may alternatively or additionally contain water-soluble cationic fabric softeners, as described in GB 2 039 556B (Unilever).

The compositions may comprise a cationic fabric softening compound and an oil, for example as disclosed in EP-A-0829531.

The compositions may alternatively or additionally contain nonionic fabric softening agents such as lanolin and derivatives thereof.

Lecithins and other phospholipids are also suitable softening compounds.

In fabric softening compositions nonionic stabilising agent may be present. Suitable nonionic stabilising agents may be present such as linear C8 to C2–2 alcohols alkoxylated with 10 to 20 moles of alkylene oxide, C10 to C20 alcohols, or mixtures thereof. Other stabilising agents include the deflocculating polymers as described in EP 0415698A2 and EP 0458599 B1.

Advantageously the nonionic stabilising agent is a linear C8 to C2–2 alcohol alkoxylated with 10 to 20 moles of alkylene oxide. Preferably, the level of nonionic stabiliser is within the range from 0.1 to 10% by weight, more preferably from 0.5 to 5% by weight, most preferably from 1 to 4% by weight. The mole ratio of the quaternary ammonium compound and/or other cationic softening agent to the nonionic stabilising agent is suitably within the range from 40:1 to about 1:1, preferably within the range from 18:1 to about 3:1.

The composition can also contain fatty acids, for example C8 to C2–4 alkyl or alkenyl monocarboxylic acids or polymers thereof. Preferably saturated fatty acids are used, in particular, hardened tallow C16 to C18 fatty acids. Preferably the fatty acid is non-saponified, more preferably the fatty acid is free, for example oleic acid, lauric acid or tallow fatty acid. The level of fatty acid material is preferably more than 0.1% by weight, more preferably more than 0.2% by weight. Concentrated compositions may comprise from 0.5 to 20% by weight of fatty acid, more preferably 1% to 10% by weight. The weight ratio of quaternary ammonium material or other cationic softening agent to fatty acid material is preferably from 10:1 to 1:10.

It is also possible to include certain mono-alkyl cationic surfactants which can be used in main-wash compositions for fabrics. Cationic surfactants that may be used include quaternary ammonium salts of the general formula R1R2R3R4N+X— wherein the R groups are long or short hydrocarbon chains, typically alkyl, hydroxyalkyl or ethoxylated alkyl groups, and X is a counter-ion (for example, compounds in which R1 is a C8–C22 alkyl group, preferably a C8–C10 or C12–C14 alkyl group, R2 is a methyl group, and R3 and R4, which may be the same or different, are methyl or hydroxyethyl groups); and cationic esters (for example, choline esters).

The choice of surface-active compound (surfactant), and the amount present, will depend on the intended use of the detergent composition. In fabric washing compositions, different surfactant systems may be chosen, as is well known to the skilled formulator, for handwashing products and for products intended for use in different types of washing machine.

The total amount of surfactant present will also depend on the intended end use and may be as high as 60 wt %, for example, in a composition for washing fabrics by hand. In compositions for machine washing of fabrics, an amount of from 5 to 40 wt % is generally appropriate. Typically the compositions will comprise at least 2 wt % surfactant e.g. 2–60%, preferably 15–40% most preferably 25–35%, by weight of the composition.

Detergent compositions suitable for use in most automatic fabric washing machines generally contain anionic non-soap surfactant, or non-ionic surfactant, or combinations of the two in any suitable ratio, optionally together with soap.

The compositions of the invention, when used as main wash fabric washing compositions, will generally also contain one or more detergency builders. The total amount of detergency builder in the compositions will typically range from 5 to 80 wt %, preferably from 10 to 60 wt %, by weight of the compositions.

Inorganic builders that may be present include sodium carbonate, if desired in combination with a crystallisation seed for calcium carbonate, as disclosed in GB 1 437 950 (Unilever); crystalline and amorphous aluminosilicates, for example, zeolites as disclosed in GB 1 473 201 (Henkel), amorphous aluminosilicates as disclosed in GB 1 473 202 (Henkel) and mixed crystalline/amorphous aluminosilicates as disclosed in GB 1 470 250 (Procter & Gamble); and layered silicates as disclosed in EP 164 514B (Hoechst). Inorganic phosphate builders, for example, sodium orthophosphate, pyrophosphate and tripolyphosphate are also suitable for use with this invention.

The compositions of the invention preferably contain an alkali metal, preferably sodium, aluminosilicate builder. Sodium aluminosilicates may generally be incorporated in amounts of from 10 to 70% by weight (anhydrous basis), preferably from 25 to 50 wt %.

The alkali metal aluminosilicate may be either crystalline or amorphous or mixtures thereof, having the general formula: $0.8–1.5Na_2O.Al_2O_3.0.8–6SiO_2$ These materials contain some bound water and are required to have a calcium ion exchange capacity of at least 50 mg CaO/g. The preferred sodium aluminosilicates contain 1.5–3.5 SiO2 units (in the formula above). Both the amorphous and the crystalline materials can be prepared readily by reaction between sodium silicate and sodium aluminate, as amply described in the literature. Suitable crystalline sodium aluminosilicate ion-exchange detergency builders are described, for example, in GB 1 429 143 (Procter & Gamble). The preferred sodium aluminosilicates of this type are the well-known commercially available zeolites A and X, and mixtures thereof.

The zeolite may be the commercially available zeolite 4A now widely used in laundry detergent powders. However, according to a preferred embodiment of the invention, the zeolite builder incorporated in the compositions of the invention is maximum aluminium zeolite P (zeolite MAP) as described and claimed in EP 384 070A (Unilever). Zeolite MAP is defined as an alkali metal aluminosilicate of the zeolite P type having a silicon to aluminium weight ratio not exceeding 1.33, preferably within the range of from 0.90 to 1.33, and more preferably within the range of from 0.90 to 1.20.

Especially preferred is zeolite MAP having a silicon to aluminium weight ratio not exceeding 1.07, more preferably about 1.00. The calcium binding capacity of zeolite MAP is generally at least 150 mg CaO per g of anhydrous material.

Organic builders that may be present include polycarboxylate polymers such as polyacrylates, acrylic/maleic copolymers, and acrylic phosphinates; monomeric polycarboxylates such as citrates, gluconates, oxydisuccinates, glycerol mono-, di and trisuccinates, carboxymethyloxy succinates, carboxymethyloxymalonates, dipicolinates, hydroxyethyliminodiacetates, alkyl- and alkenylmalonates and succinates; and sulphonated fatty acid salts. This list is not intended to be exhaustive.

Especially preferred organic builders are citrates, suitably used in amounts of from 5 to 30 wt %, preferably from 10 to 25 wt %; and acrylic polymers, more especially acrylic/maleic copolymers, suitably used in amounts of from 0.5 to 15 wt %, preferably from 1 to 10 wt %.

Builders, both inorganic and organic, are preferably present in alkali metal salt, especially sodium salt, form.

Compositions according to the invention may also suitably contain a bleach system. Fabric washing compositions may desirably contain peroxy bleach compounds, for example, inorganic persalts or organic peroxyacids, capable of yielding hydrogen peroxide in aqueous solution.

Suitable peroxy bleach compounds include organic peroxides such as urea peroxide, and inorganic persalts such as the alkali metal perborates, percarbonates, perphosphates, persilicates and persulphates. Preferred inorganic persalts are sodium perborate monohydrate and tetrahydrate, and sodium percarbonate.

Especially preferred is sodium percarbonate having a protective coating against destabilisation by moisture. Sodium percarbonate having a protective coating comprising sodium metaborate and sodium silicate is disclosed in GB 2 123 044B (Kao).

The peroxy bleach compound is suitably present in an amount of from 0.1 to 35 wt %, preferably from 0.5 to 25 wt %. The peroxy bleach compound may be used in conjunction with a bleach activator (bleach precursor) to improve bleaching action at low wash temperatures. The bleach precursor is suitably present in an amount of from 0.1 to 8 wt %, preferably from 0.5 to 5 wt %.

Preferred bleach precursors are peroxycarboxylic acid precursors, more especially peracetic acid precursors and pernoanoic acid precursors. Especially preferred bleach precursors suitable for use in the present invention are N,N,N',N',-tetracetyl ethylenediamine (TAED) and sodium nonanoyloxybenzene sulphonate (SNOBS). The novel quaternary ammonium and phosphonium bleach precursors disclosed in U.S. Pat. No. 4,751,015 and U.S. Pat. No. 4,818,426 (Lever Brothers Company) and EP 402 971A (Unilever), and the cationic bleach precursors disclosed in EP 284 292A and EP 303 520A (Kao) are also of interest.

The bleach system can be either supplemented with or replaced by a peroxyacid. Examples of such peracids can be found in U.S. Pat. No. 4,686,063 and U.S. Pat. No. 5,397,501 (Unilever). A preferred example is the imido peroxycarboxylic class of peracids described in EP A 325 288, EP A 349 940, DE 382 3172 and EP 325 289. A particularly preferred example is phthalimido peroxy caproic acid (PAP). Such peracids are suitably present at 0.1–12%, preferably 0.5–10%. A bleach stabiliser (transition metal sequestrant) may also be present. Suitable bleach stabilisers include ethylenediamine tetra-acetate (EDTA), the polyphosphonates such as Dequest (Trade Mark) and non-phosphate stabilisers such as EDDS (ethylene diamine di-succinic acid). These bleach stabilisers are also useful for stain removal especially in products containing low levels of bleaching species or no bleaching species.

An especially preferred bleach system comprises a peroxy bleach compound (preferably sodium percarbonate optionally together with a bleach activator), and a transition metal bleach catalyst as described and claimed in EP 458 397A, EP 458 398A and EP 509 787A (Unilever).

The compositions according to the invention may also contain one or more enzyme(s).

Suitable enzymes include the proteases, amylases, cellulases, oxidases, peroxidases and lipases usable for incorporation in detergent compositions. Preferred proteolytic enzymes (proteases) are, catalytically active protein materials which degrade or alter protein types of stains when present as in fabric stains in a hydrolysis reaction. They may be of any suitable origin, such as vegetable, animal, bacterial or yeast origin.

Proteolytic enzymes or proteases of various qualities and origins and having activity in various pH ranges of from 4–12 are available and can be used in the instant invention. Examples of suitable proteolytic enzymes are the subtilisins which are obtained from particular strains of *B. Subtilis B. licheniformis*, such as the commercially available subtilisins Maxatase (Trade Mark), as supplied by Genencor International N.V., Delft, Holland, and Alcalase (Trade Mark), as supplied by Novozymes Industri A/S, Copenhagen, Denmark.

Particularly suitable is a protease obtained from a strain of *Bacillus* having maximum activity throughout the pH range of 8–12, being commercially available, e.g. from Novozymes Industri A/S under the registered trade-names Esperase (Trade Mark) and Savinase (Trade-Mark). The preparation of these and analogous enzymes is described in GB 1 243 785. Other commercial proteases are Kazusase (Trade Mark obtainable from Showa-Denko of Japan), Optimase (Trade Mark from Miles Kali-Chemie, Hannover, West Germany), and Superase (Trade Mark obtainable from Pfizer of U.S.A.).

Detergency enzymes are commonly employed in granular form in amounts of from about 0.1 to about 3.0 wt %. However, any suitable physical form of enzyme may be used.

The compositions of the invention may contain alkali metal, preferably sodium carbonate, in order to increase detergency and ease processing. Sodium carbonate may suitably be present in amounts ranging from 1 to 60 wt %, preferably from 2 to 40 wt %. However, compositions containing little or no sodium carbonate are also within the scope of the invention.

Powder flow may be improved by the incorporation of a small amount of a powder structurant, for example, a fatty acid (or fatty acid soap), a sugar, an acrylate or acrylate/maleate copolymer, or sodium silicate. One preferred powder structurant is fatty acid soap, suitably present in an amount of from 1 to 5 wt %.

Other materials that may be present in detergent compositions of the invention include sodium silicate; antiredeposition agents such as cellulosic polymers; soil release polymers; inorganic salts such as sodium sulphate; or lather boosters as appropriate; proteolytic and lipolytic enzymes; dyes; coloured speckles; fluorescers and decoupling polymers. This list is not intended to be exhaustive. However, many of these ingredients will be better delivered as benefit agent groups in materials produced according to the first aspect of the invention.

The detergent composition when diluted in the wash liquor (during a typical wash cycle) will typically give a pH of the wash liquor from 7 to 10.5 for a main wash detergent.

Particulate detergent compositions are suitably prepared by spray-drying a slurry of compatible heat-insensitive ingredients, and then spraying on or post-dosing those ingredients unsuitable for processing via the slurry. The skilled detergent formulator will have no difficulty in deciding which ingredients should be included in the slurry and which should not.

Particulate detergent compositions of the invention preferably have a bulk density of at least 400 g/litre, more preferably at least 500 g/litre. Especially preferred compositions have bulk densities of at least 650 g/litre, more preferably at least 700 g/litre.

Such powders may be prepared either by post-tower densification of spray-dried powder, or by wholly non-tower methods such as dry mixing and granulation; in both cases a high-speed mixer/granulator may advantageously be used. Processes using high-speed mixer/granulators are disclosed, for example, in EP 340 013A, EP 367 339A, EP 390 251A and EP 420 317A (Unilever).

Liquid detergent compositions can be prepared by admixing the essential and optional ingredients thereof in any desired order to provide compositions containing components in the requisite concentrations. Liquid compositions according to the present invention can also be in compact form which means it will contain a lower level of water compared to a conventional liquid detergent.

Product Forms

Product forms include powders, liquids, gels, tablets, any of which are optionally incorporated in a water-soluble or water dispersible sachet. The means for manufacturing any of the product forms are well known in the art. If the polysaccharide-grafted polymer particles are to be incorporated in a powder (optionally the powder to be tableted), and whether or not pre-emulsified, they are optionally included in a separate granular component, e.g. also containing a water soluble organic or inorganic material, or in encapsulated form.

Substrate

When used in laundering, the substrate may be any substrate onto which it is desirable to deposit polymer particles and which is subjected to treatment such as a washing or rinsing process.

In particular, the substrate may be a textile fabric. It has been found that particularly good results are achieved when using a natural fabric substrate such as cotton, or fabric blends containing cotton.

Treatment

The treatment of the substrate with the material of the invention can be made by any suitable method such as washing, soaking or rinsing of the substrate.

Typically the treatment will involve a washing or rinsing method such as treatment in the main wash or rinse cycle of a washing machine and involves contacting the substrate with an aqueous medium comprising the material of the invention.

EXAMPLES

The present invention will now be explained in more detail by reference to the following non-limiting examples:—

In the following examples where percentages are mentioned, this is to be understood as percentage by weight.

Example 1

Preparation of Locust Bean Gum-Grafted Polymer Particles by Miniemulsion Polymerisation Polysaccharide-Grafted Polymer Particles P1 were Prepared as Follows:

Locust Bean Gum (LBG) (2 g) was added to demineralised water (369.5 g) with pH adjustment to 2.5 (via the addition of 1M HCl) and homogenised using a Silverson homogeniser at 10,000 rpm for 2 min. The resulting LBG solution was then heated using an isomantle to 70° C. before being thoroughly mixed at 10,000 rpm for 1 hour. Sodium Dodecyl Sulphate (SDS) (1.5 g) was then added to the LBG solution and allowed to dissolve.

Methyl Methacrylate (80 g), Methacrylic Acid (20 g), Ethylene Glycol dimethacrylate (1 g) and a cosurfactant Hexadecane (2 g) were added to a 1 litre reaction vessel. The LBG solution previously prepared was then added to the reaction vessel and the components mixed using a high shear homogeniser at 10,000 rpm for 5 min. The resulting emulsion was then sonicated on full power for 15 mins, to form the miniemulsion, with the reaction vessel submerged in ice to prevent the reactants in the reaction vessel from reaching boiling point.

A five-necked lid which was fitted with a stirrer paddle, thermometer, nitrogen purge and condenser was secured to the reaction vessel.

The miniemulsion was heated in an isomantle to 65° C. with stirring at 300 rpm and purging with nitrogen. When at 65° C., the nitrogen purge was removed from solution but nitrogen was still allowed to flow over the surface of the reactants. An initiator solution was added to the reaction vessel to start the polymerisation. The initiator solution comprised ammonium persulphate (1.5 g) in deionised water (5 g).

Shortly after the addition of the initiator solution, an exotherm was observed that elevated the reactant temperature to ~80° C.

After the exotherm had completed (~20 min) an extra amount of SDS (2.5 g in 15 g demineralised water) was added to the reactants to provide additional stabilisation against coagulation.

The reactants were allowed to react for a total of 2 hours from the addition of initiator before the products were cooled to room temperature and filtered through 40 Denier nylon mesh. The total solids content was found to be ~20% (by drying to constant weight in an oven). The solids were the particles comprising poly[(methyl methacrylate(80%)-co-(methacrylic acid(20%)] cross-linked with 1% ethylene glycol dimethacrylate and comprising 2% grafted LBG.

Comparative Example A, a control polymer containing no LBG, was also prepared in the same way with the omission of the LBG from the synthesis (the water level was increased by 2 g in order to maintain equal total weight prior to emulsifying).

Example 2

Wash Deposition of P1 and Comparative Example A onto Cotton

Using a UV-visible Spectrophotometer a linear calibration plot for absorbance at 400 nm versus concentration of LBG grafted co-polymer particle was found to exist for polymer particle concentrations below 800 ppm. A similar trend was observed Comparative Example A. These calibration plots were then used to determine the amount of polymer particles that deposits onto cotton in a simulated wash process.

The Simulated Wash Process

Preparation of Stock Solutions:

Surfactant Stock: (10 g/L 50:50 LAS:A7) was prepared by dissolving Linear Alkyl Benzene Sulphonate (9.09 g LAS (55% Active)) and Synperonic A7 (5 g) in deionised water to a total of 1 litre.

Base Buffer Stock: (0.1 M) was prepared by dissolving Sodium Carbonate (7.5465 g) and Sodium Hydrogen Carbonate (2.4195 g) in deionised water to a total of 1 litre.

Preparation of the Wash Liquor:

Base Buffer Stock (12.5 ml) and surfactant stock (12.5 ml) were added to a high density poly(ethylene) wash bottle of 150 ml capacity and 100 ml de-ionised water was added to produce a wash liquor buffered at pH 10.5 and containing 1 g/L surfactant (50:50 LAS:A7).

Simulated Wash:

0.5 g of polymer particles, P1 or Comparative Example A, (800 ppm of particles based on wash liquor) was added to the wash liquor and the Absorbance produced at 400 nm recorded through a 1 cm cuvette. The value ABS400 nm was used to determine, by interpolation of the calibration plot, the amount of polymer particles in the wash liquor prior to the simulated wash process.

A section of unfluoresced cotton measuring 20 cm by 20 cm was placed into the wash bottle containing the wash liquor and polymer particles and the bottle was sealed. The wash bottle was then placed into a shaker bath, thermostated at 40° C., for 1 hour to simulate a wash process. After 1 hour the cloth was removed from the wash bottle, wrung out, and the ABS400 nm recorded of the wash liquor and the concentration of polymer particles in solution determined by interpolation of the calibration plot. The wash process was carried out in triplicate.

The results are shown in Table 1.

TABLE 1

Wash Deposition of P1 and Comparative Example A onto cotton:

| Polymer Particles | % Deposited (on initial dose) |
|---|---|
| P1 | 30% |
| Comparative Example A | −9% |

The results in Table 1 show the much enhanced deposition induced by the LBG grafted particles onto cotton fabric, compared to those particles without LBG grafted onto them.

Example 3

Characterisation of the Swelling Behaviour of LBG-Grafted Polymer Particles Produced Via Miniemulsion Polymerisation Photon Correlation Spectroscopy (PCS) was used to characterise the swelling behaviour of the LBG-grafted polymer particles. The influence of change in solution pH and added electrolyte was investigated.

LBG-grafted polymer particles, P1, (not exceeding 0.08%) were dissolved in the following: de-mineralised water, 0.1 M NaCl and surfactant solutions at pH 6.5 and surfactant solution at pH 10.5.

Solution pH was altered by addition of either dilute HCl or NaOH.

The particle size was then determined using a Malvern 3000Hsa Zetasizer at 25° C.

The results are shown in Table 2.

TABLE 2

Particle Size of P1 under Various Conditions:

| Solvent | pH | Particle Diameter/nm |
|---|---|---|
| Demineralised water. | 6.5 | 158 |
| Demineralised water. | 10.5 | 259 |
| 0.1 M NaCl | 6.5 | 151 |
| 0.1 M NaCl | 10.5 | 217 |
| 1 g/L LAS:A7 (50:50) | 6.5 | 153 |
| 1 g/L LAS:A7 (50:50) | 10.5 | 259 |
| 1 g/L LAS:A7 (50:50) in 0.1 M NaCl | 6.5 | 147 |
| 1 g/L LAS:A7 (50:50) in 0.1 M NaCl | 10.5 | 218 |

The results presented in Table 2 show that the particles according to the invention swell substantially when the solution pH goes from neutral to basic conditions.

Example 4

Synthesis of Aminosilicone Containing LBG-Grafted Particles Via Miniemulsion Polymerisation Polysaccharide-Grafted Polymer Particles P2 were Prepared as Follows:

The procedure for preparing the silicone containing LBG-grafted particles was similar to the preparation route detailed in Example 1, except the following changes were made:
1) Methyl methacrylate (MMA) (100 g) was used as the sole monomer and 5 g of aminosilicone (Rhodorsil Oil Extrasoft from Rhodia Silicones) was dissolved in the monomer prior to emulsification and polymerisation.
2) The water used to solubilise the LBG prior to emulsification was reduced by 5 g.
3) The LBG was 1.5% (w/w) of monomer.

Comparative Example B: Similarly, a control aminosilicone containing polymer particle was prepared using methyl methacrylate as the sole monomer with the omission of LBG from the synthesis (and the water level increased by 1.5 g to maintain equal weight prior to emulsifying).

Comparative Example C: A further polymer particle was prepared with the omission of aminosilicone and LBG (and the water level increased by 6.5 g to maintain equal weight prior to emulsifying).

Example 5

Deposition of P2 and Comparative Examples B and C onto Cotton

The wash deposition of the particles prepared in Example 4 were measured using a similar procedure to that given in Example 2. The linear calibration plot for absorbance at 400 nm versus concentration was found to extend up to 1,500 ppm and polymer particles P2 and Comparative Examples B and C were dosed at 1,200 ppm by weight of wash solution.

The deposition of the particles of P2, Comparative Example B and Comparative Example C is shown in Table 3.

TABLE 3

| Particles | Deposition of particles % Deposited (on initial dose) |
|---|---|
| P2 | 46.2% |
| B | 24.1% |
| C | −2.2% (~0%) |

The results in Table 3 show superior deposition of the particles according to the invention compared with the comparative examples.

Example 6

Evaluation of Softening Benefit

The softness conferred to cotton by the polymer particles P2 and Comparative Examples B and C prepared in Example 4 was evaluated by assessing the dynamic friction of cotton before and after treatment.

The polymer particles P2 and Comparative Examples B and C prepared in Example 4 were applied to woven cotton at a level of 2% (w/w on weight of fabric). The initial latexes contained 20% solids (particles) in water. These were diluted with water to give a 2% (w/w) solids solution which was applied to woven cotton using a 'Padder' (ex. Werner Mathis) as follows:

The Werner Mathis Padder was used to remove water from wet fabric by compression between two rollers. Woven cotton sheeting (40×30 mm) was immersed in the 2% solids latex solution and wetted thoroughly. The 'Padder' was set at a roller pressure of 65 and speed of 2.5 m per minute. Excess latex solution was then removed by passing the cotton sheet between the rollers of the 'Padder.' The fabric weight was monitored before and after padding to allow determination of the percentage 'pick-up' on weight of fabric. This was found to be 100% and consequently the dried fabric contained 2% of particles on weight of fabric. After padding the samples were immediately tumble dried for 20 minutes (high temperature cotton setting using a Zanussi TD 525 tumble dryer) and ironed flat (Philips Elance 14 iron at cotton setting).

After ironing, the samples were left overnight in a controlled temperature and humidity room (20° C., 65% relative humidity) and all subsequent mechanical testing was conducted under these conditions.

The dynamic friction for both treated fabrics were determined using an Instron Testometric (trademark) machine using a friction sled attachment as follows:

The Instron Testometric (M350-5kn) is a computer controlled, programmable, fabric properties testing station. It can be used to perform a variety of fabric testing, including friction, via the attachment of a number of accessories. The Instron comprises a vertical frame with a moving cross-head with attached load cell. To measure fabric/fabric friction the friction sled attachment was fitted. This consists of a rectangular platform (420×100 mm) with a pulley at one end that is fixed to the bottom of the frame. A string is attached to the crosshead and lopped around the pulley and attached to a metal sledge (62×62 mm, 200 g) that rest on the platform. Prior to assembly the platform and sled are covered with the test fabric using double sided adhesive tape. The fabric is applied such that the warp fibres on the sledge and aligned with those on the platform. The machine settings are as follows:

Mode=T (tension)
Units=N (Newtons)
Sample break detector (SBD)=0
Speed=100 mm/min
Return Speed=900 mm/min
Load Cell=2 kgf
Distance pulled=100 mm The fabric covered sled is placed on the platform at the opposite end to the pulley. The test is begun and the crosshead begins to move vertically and consequently the sled is slowly pulled along the fabric covered platform. A measure of the force versus distance travelled is recorded which is analysed by the computer to give a measurement of the co-efficient of dynamic friction for the fabric.

The results for the LBG grafted polymer particles with and without aminosilicone are shown in Table 4.

TABLE 4

| Coefficient of Dynamic Friction for Aminosilicone Latex | |
|---|---|
| Latex Sample | Coefficient of Dynamic Friction |
| P2 | 0.682 |
| B | 0.743 |
| C | 0.739 |

It will be seen that the particles according to the invention (i.e. with incorporation of silicone and LBG into the latex) leads to reduced fabric friction compared to the particles outwith the invention. The reduction in fabric friction gives the fabric a softer feel and ease of ironing benefit.

The invention claimed is:

1. A process for the preparation of polysaccharide-grafted polymer particles, wherein the polysaccharide has β-1,4 linkages, wherein the polymer particles are made from monomers that contain at least one ethylenically unsaturated group, wherein the process for preparation comprises miniemulsion polymerization of monomers wherein the process comprises the steps of:
   (i) mixing said monomers with a cosurfactant to form a mixture (Y),
   (ii) dissolving a polysaccharide and a surfactant in water to form a mixture (z),
   (iii) combining (y) and (z) with high shear to form a miniemulsion and
   (iv) adding an initiator such that polymerization and simultaneous grafting of the polysaccharide onto the polymer particles proceeds.

2. A process as claimed in claim 1 wherein the miniemulsion has a particle size of less than 1 micron, preferably of less than 500nm.

3. A process as claimed in claim 1 wherein the monomers are suitable for free radical aqueous emulsion polymerization.

4. A process as claimed in claim 1 wherein the monomers are chosen from the group consisting of olefins, ethylene, vinylaromatic monomers, divinyl benzene, esters of vinyl alcohol and monocarboxylic acids, esters of α,β-monoethylenically unsaturated mono- and dicarboxylic acids with alcohols, dimethyl or di-n-butyl maleate, nitriles of α,β-monoethylenically unsaturated carboxylic acids, conjugated dienes, α,β-monoethylenically unsaturated monocarboxylic and dicarboxylic acids and their amides, vinyl-sulfonic acid and its water-soluble salts, and alkylene glycol diacrylates and dimethacrylates.

5. A process as claimed in claim 4 wherein the monomer is selected from the group consisting of styrene, α-methylstyrene, o-chlorostyrene, vinyltoluenes, vinyl acetate, vinyl propionate, vinyl n-butyrate, vinyl laurate, vinyl stearate, esters of acrylic, methacrylic, maleic, fumaric or itaconic acid with methyl, ethyl, n-butyl, isobutyl or 2-ethylhexyl alcohol, acrylonitrile, 1,3-butadiene, isoprene, acrylic acid, methacrylic acid, maleic acid, fumaric acid, itaconic acid, acrylamide, methacrylamide, poly (alkylene oxide) monoacrylates and monomethacrylates, N-vinyl-pyrrolidone, ethylene glycol diacrylate, 1,2-propylene glycol diacrylate, 1,3-propylene glycol diacrylate, 1,3-butylene glycol diacrylate, 1,4-butylene glycol diacrylates, ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate, and triallyl cyanurate.

6. A process as claimed in claim 1 wherein the polysaccharide is present at levels of from 0.1% to 10% w/w of the monomer.

7. A process as claimed in claim 1 wherein the cosurfactant is selected from the group consisting of hexadecane, cetyl alcohol, lauroyl peroxide, n-dodecyl mercaptan, dodecyl methacrylate, stearyl methacrylate, polystyrene and polymethyl methacrylate.

8. A process as claimed in claim 1 wherein the polysaccharide is selected from the group consisting of a polymannan, polyglucan, polyglucomannan, polyxyloglucan and polygalactomannan and a mixture thereof.

9. A process as claimed in claim 8 wherein the polysaceharide is locust bean gum.

10. A process as claimed in claim 1 wherein the initiator is selected from the group consisting of benzoyl peroxide, t-butyl peroxide, hydrogen peroxide, azobisisobutyronitrile, ammonium persulphate, 2,2'-azobis (cyanopropane), benzophenone, benzoin, ammonium persulphate/sodium metabisulphite mixture, cumyl hydroperoxide/ferrous ion mixture and asorbic acid/hydrogen peroxide mixture.

11. A process as claimed in claim 1 wherein the polysaccharide-grafted particles contain an additional fabric benefit agent.

12. A process as claimed in claim 11 wherein the fabric benefit agent is selected from the group consisting of fabric softeners, lubricants, ease of ironing aids, stiffening agents, moisturising agents, shape retention aids, crease reduction agents, anti-pilling agents, colour preservatives, perfumes, drape modifiers, fluorescers, sunscreens, photofading inhibitors, fungicides and insect repellents.

13. A method of treating fabric, comprising
  (I) preparing polysaccharide-grafted polymer particles, wherein the polysaccharide has β-1,4linkages, wherein the polymer particles are made from monomers that contain at least one ethylenically unsaturated group, wherein preparing said polymer particles comprises miniemulsion polymerization of monomers, which comprises the steps of:
    (i) mixing said monomers with a cosurfactant to form a mixture (y),
    (ii) dissolving a polysaccharide and a surfactant in water to form a mixture (z),
    (iii) combining (y) and (z) with high shear to form a miniemulsion and
    (iv) adding an initiator such that polymerization and simultaneous grafting of the polysaccharide onto the polymer particles proceeds to form polysaccharide-grafted polymer particles, and
  (II) contacting the fabric with said polysaccharide-grafted polymer particles.

14. A method of treating fabric to deliver one or more benefit agents to the fabric comprising
  (I) preparing polysaccharide-grafted polymer particles, wherein the polysaccharide has β-1,4linkages, wherein the polymer particles are made from monomers that contain at least one ethylenically unsaturated group, wherein preparing said polymer particles comprises miniemulsion polymerization of monomers, which comprises the steps of:
    (i) mixing said monomers with a cosurfactant to form a mixture (y),
    (ii) dissolving a polysaccharide and a surfactant in water to form a mixture (z),
    (iii) combining (y) and (z) with high shear to form a miniemulsion and
    (iv) adding an initiator such that polymerization and simultaneous grafting of the polysaccharide onto the polymer particles proceeds to form polysaccharide-grafted polymer particles, and
  (II) contacting the fabric with said polysaccharide-grafted polymer particles and one or more benefit agents.

15. The method of claim 14, wherein the method is applied to cotton, to provide one or more of a fabric softening, lubricant, ease of ironing, stiffening, moisturising, shape retention, crease reduction, anti-pilling, colour preserving, perfume enhancing, drape modifying, fluorescent, sunscreen, photofading inhibition, fungicidal or insect repellent effect to the fabric.

* * * * *